(12) United States Patent
Nilsson (10) Patent No.: US 11,405,083 B2
(45) Date of Patent: Aug. 2, 2022

(54) UN-MANNED AERIAL VEHICLE COMPRISING AN ANTENNA ELEMENT PANEL

(71) Applicant: Telefonaktiebolaget LM Ericsson (publ), Stockholm (SE)

(72) Inventor: Andreas Nilsson, Gothenburg (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 52 days.

(21) Appl. No.: 16/977,589

(22) PCT Filed: Mar. 6, 2018

(86) PCT No.: PCT/EP2018/055490
§ 371 (c)(1),
(2) Date: Sep. 2, 2020

(87) PCT Pub. No.: WO2019/170223
PCT Pub. Date: Sep. 12, 2019

(65) Prior Publication Data
US 2020/0412426 A1 Dec. 31, 2020

(51) Int. Cl.
*H04B 7/06* (2006.01)
*H04B 17/318* (2015.01)
(Continued)

(52) U.S. Cl.
CPC ......... *H04B 7/0617* (2013.01); *B64C 39/024* (2013.01); *H01Q 1/1257* (2013.01);
(Continued)

(58) Field of Classification Search
CPC .................................................. H04B 7/0617
(Continued)

(56) References Cited

U.S. PATENT DOCUMENTS 5,365,234 A * 11/1994 Lewis ........................ G01S 7/36
342/16
5,854,609 A * 12/1998 Pyo ........................... G01S 3/42
342/359
(Continued)

FOREIGN PATENT DOCUMENTS

GB 2536016 A 7/2016
WO 9923769 A1 5/1999
(Continued)

OTHER PUBLICATIONS

International Search Report dated Jan. 17, 2019 for International Application No. PCT/EP2018/055490 filed on Mar. 6, 2018, consisting of 18-pages.
(Continued)

*Primary Examiner* — Lihong Yu
(74) *Attorney, Agent, or Firm* — Christopher & Weisberg, P.A.

(57) ABSTRACT

The present disclosure relates to an un-manned aerial vehicle having a control unit, a body part and an antenna arrangement that includes an antenna element panel and at least one antenna port that is adapted to provide at least one antenna beam that is electrically steerable to at least two different directions. The aerial vehicle further has a direction unit that connects the antenna element panel to the body part, where the direction unit is adapted to set the antenna element panel in at least two different positions relative the body part.

19 Claims, 7 Drawing Sheets

(51) Int. Cl.
  *B64C 39/02* (2006.01)
  *H01Q 1/12* (2006.01)
  *H01Q 1/28* (2006.01)
  *H01Q 3/08* (2006.01)
  *H01Q 3/26* (2006.01)

(52) U.S. Cl.
  CPC ............... *H01Q 1/28* (2013.01); *H01Q 3/08* (2013.01); *H01Q 3/2605* (2013.01); *H04B 17/318* (2015.01); *B64C 2201/146* (2013.01)

(58) Field of Classification Search
  USPC ....................................................... 375/267
  See application file for complete search history.

(56) References Cited

U.S. PATENT DOCUMENTS

| | | |
|---|---|---|
| 9,836,049 B1 | 12/2017 | Tu |
| 2004/0196813 A1* | 10/2004 | Ofek .................... H01Q 21/065 370/334 |
| 2008/0007454 A1* | 1/2008 | Minkoff ............ H04L 25/03006 342/379 |
| 2014/0139372 A1* | 5/2014 | Seol .......................... G01S 3/28 342/367 |
| 2016/0241323 A1* | 8/2016 | Ko ....................... H04B 7/0617 |
| 2017/0059688 A1 | 3/2017 | Gan |
| 2017/0343645 A1* | 11/2017 | Kim ......................... B64C 3/38 |

FOREIGN PATENT DOCUMENTS

| | | |
|---|---|---|
| WO | 2008106624 A2 | 9/2008 |
| WO | 2017041302 A1 | 3/2017 |

OTHER PUBLICATIONS

EPO Communication dated Aug. 12, 2021 for Patent Application No. 18711052.3, consisting of 5-pages.

* cited by examiner

UN-MANNED AERIAL VEHICLE COMPRISING AN ANTENNA ELEMENT PANEL

CROSS-REFERENCE TO RELATED APPLICATIONS

This application is a Submission Under 35 U.S.C. § 371 for U.S. National Stage Patent Application of International Application Number: PCT/EP2018/055490, filed Mar. 6, 2018 entitled "UN-MANNED AERIAL VEHICLE COMPRISING AN ANTENNA ELEMENT PANEL," the entirety of which is incorporated herein by reference.

TECHNICAL FIELD

The present disclosure relates to an un-manned aerial vehicle comprising a control unit, a body part and an antenna arrangement that comprises an antenna element panel.

BACKGROUND

Unmanned aerial vehicles (UAV), hereafter referred to as drones, become more and more common in the society. Some use cases of drones are for example aerial surveillance, professional aerial surveying, commercial and motion picture filmmaking, news gathering for journalism, observation by police forces, search and rescue operations, scientific research, disaster relief, passenger transportation, cargo transportation etc.

For safety and performance reasons it is expected that future drones will be connected to wireless networks, hence 3GPP has started with drone related standardization work for LTE (Long Term Evolution). It is expected that similar standardization work will be done for NR (New Radio). However, there are also a risk that restrictions/regulations in different countries will prohibit the future uses of drones due to potential problems.

One of the main concerns relates to that connected drones may create too much interference in the network such that normal cell phone services will have reduced functionality. A drone creates interference since it typically flies relatively high up in the air and then experiences line-of sight channels to multiple base stations simultaneously. Therefore, whenever the drone transmit signals via an attached antenna arrangement, it will cause noticeable interference to all neighboring base stations.

One way to mitigate the problem of drone-generated interference, and at the same time improve the coverage, is to utilize beamforming at the drone's antenna arrangement which then comprises an antenna panel. The antenna panel can then generate a narrow high-gain beam to the serving base station and in this way focus the energy in that direction. However, generating narrow beams typically requires a large antenna aperture relative the wavelength which makes it practically very difficult to implement such antenna panels for lower frequencies. However, for higher frequencies, the antenna apertures can be made quite small even for high gain antennas. Hence, it is expected that the drones in the future will be connected to the network using NR at relatively high frequencies, typically above 6 GHz.

It is difficult to design a beamforming architecture that is adapted to generate beams in arbitrarily directions, which is needed for such an antenna panel since base stations can be located in basically any direction since the typical angular coverage area is not enough. Using multiple antenna panels pointing in different directions at a drone is undesirable since it is important to keep both cost and weight as low as possible.

SUMMARY

It is an object of the present disclosure to provide an un-manned aerial vehicle which does not generate undesired interfering signals when communicating with another object, such as a base station, via an antenna element panel.

Said object is obtained by means of an un-manned aerial vehicle comprising a control unit, a body part and an antenna arrangement that comprises an antenna element panel and at least one antenna port that is adapted to provide at least one antenna beam that is electrically steerable to at least two different directions. The aerial vehicle further comprises a direction unit that connects the antenna element panel to the body part. The direction unit is adapted to set the antenna element panel in at least two different positions relative the body part.

This confers an advantage related to enabling contact between an aerial vehicle and another object via an antenna element panel comprised in the aerial vehicle even if a beamforming capability of the antenna element panel is insufficient.

According to some aspects, the antenna arrangement comprises a first antenna port adapted to provide at least a first antenna beam of a first polarization and a second antenna port adapted to provide at least a second antenna beam of a second polarization, orthogonal to the first polarization.

This confers an advantage of providing communication via orthogonal polarizations.

According to some aspects, the direction unit comprises a step-motor assembly that is connected to the antenna element panel, where the control unit is adapted to control the step-motor assembly such that a desired position of the antenna element panel is maintained.

This confers an advantage of enabling stable and accurate control of the antenna element panel's position.

According to some aspects, the step-motor assembly comprises two independently controllable step-motors.

This confers an advantage of enabling stable and accurate control of the antenna element panel's position in two dimensions.

According to some aspects, the control unit is adapted to steer each antenna beam to at least two different directions and to determine in which direction each antenna port is enabled to receive a signal of a highest signal strength. The control unit is furthermore adapted to set the antenna element panel in a position in dependence of said determined direction.

According to some aspects, the control unit is adapted to set the antenna element panel in such a position that each steerable beam has a minimized tilt angle relative the antenna element panel in the direction a signal of a highest signal strength is received.

This confers an advantage of enabling an automatically controlled contact via the antenna element panel.

According to some aspects, each antenna port is connected to a plurality of antenna elements via a corresponding phase altering device for each antenna element. The control unit is adapted to control each phase altering device.

According to some aspects, each antenna port is connected to a digital beamforming (DBF) network.

This confers an advantage of enabling digital beamforming.

There are also disclosed herein methods and computer programs associated with the above-mentioned advantages.

BRIEF DESCRIPTION OF THE DRAWINGS

The present disclosure will now be described more in detail with reference to the appended drawings, where.

DETAILED DESCRIPTION

In the following, reference is made to FIG. 1A that shows a front view of an antenna arrangement 100, FIG. 1B that shows a first perspective view of the antenna arrangement 100, FIG. 1C that shows a second perspective view of the antenna arrangement 100 and FIG. 2A that shows an un-manned aerial vehicle 200.

The aerial vehicle 200 comprises a control unit 201, a body part 202 and the antenna arrangement 100 that comprises an antenna element panel 101 and two antenna ports 102, 103. A first antenna port 102 is adapted to provide a first antenna beam 104 of a first polarization P1 and a second antenna port 103 adapted to provide a second antenna beam 105 of a second polarization P2, orthogonal to the first polarization (P1). As illustrated for the first antenna beam 104 in FIG. 1C, each antenna beam is electrically steerable to a plurality antenna beams 104 of different directions 104, 104a, 104b, 104c, 104d. As shown in FIG. 1B, according to some aspects, each antenna beam 104, 105 is electrically steerable along an azimuth direction 111 and an elevation direction 112.

In order to enable such a steering, each antenna port 102, 103 is connected to a plurality of antenna elements 106, 107 (only one of each polarization indicated with reference number for reasons of clarity) via a corresponding phase altering device 108, 109 (only indicated with reference number for two antenna elements for reasons of clarity) for each antenna element 106, 107. The control unit 201 is adapted to control each phase altering device 108, 109.

According to some aspects, each antenna port 102, 103 is connected to a digital beamforming (DBF) network 110.

According to the present disclosure, the aerial vehicle 200 further comprises a direction unit 203 that connects the antenna element panel 101 to the body part 202, where the direction unit 203 is adapted to set the antenna element panel 101 in a plurality of positions relative the body part 202 as indicated in FIG. 2A-2D.

For this purpose, the direction unit 203 comprises a step-motor assembly 204 that is connected to the antenna element panel 101. The control unit 201 is adapted to control the step-motor assembly 204 such that a desired position of the antenna element panel 101 is maintained.

Figure 2A:
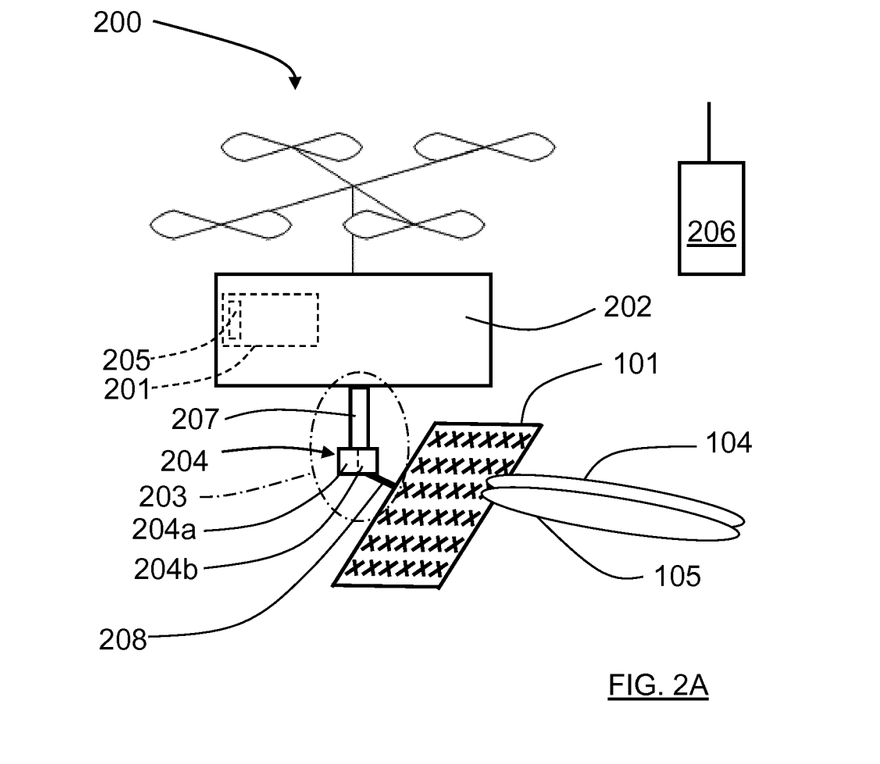
FIG. 2A schematically shows an un-manned aerial vehicle where the antenna element panel has a first position relative a body part of the aerial vehicle.
Figure 2B:
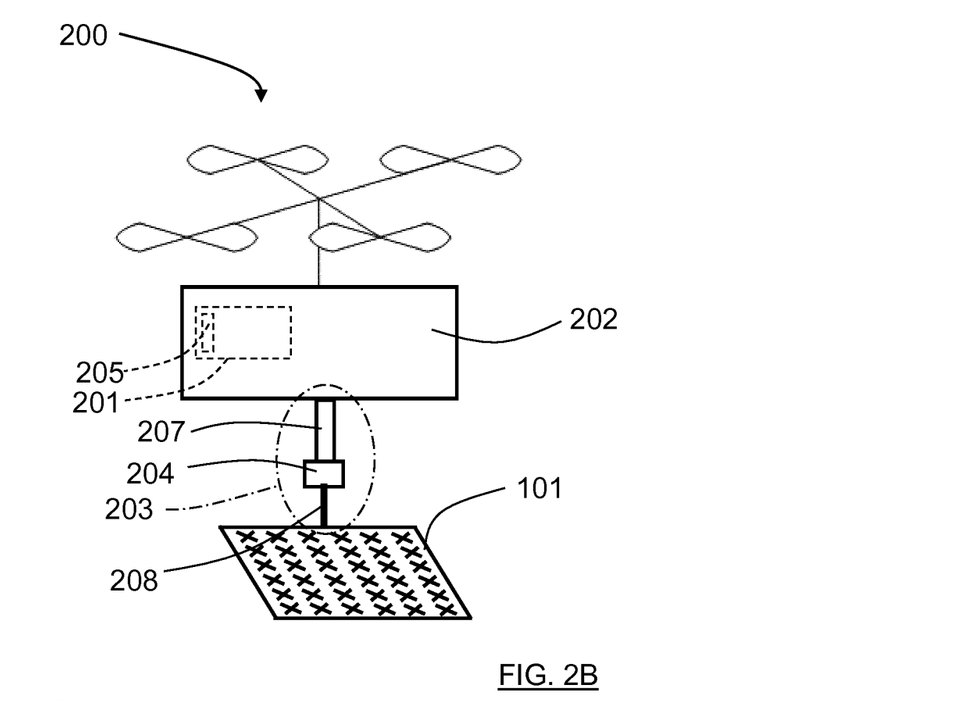
FIG. 2B schematically shows an un-manned aerial vehicle where the antenna element panel has a second position relative a body part of the aerial vehicle.
Figure 2C:
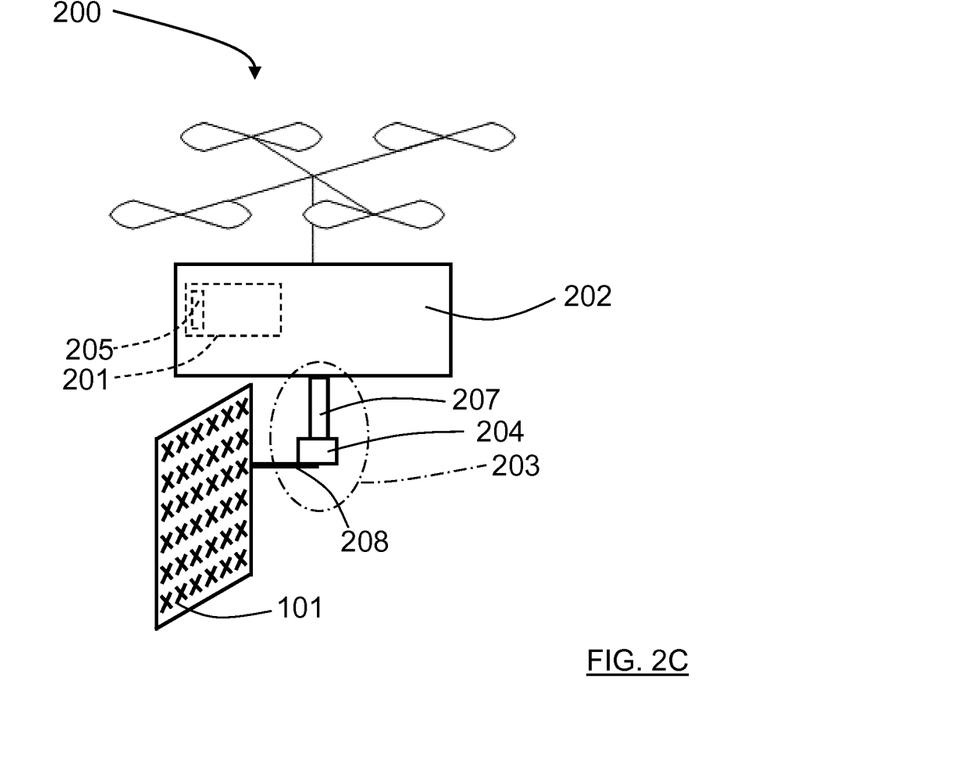
FIG. 2C schematically shows an un-manned aerial vehicle where the antenna element panel has a third position relative a body part of the aerial vehicle.
Figure 2D:
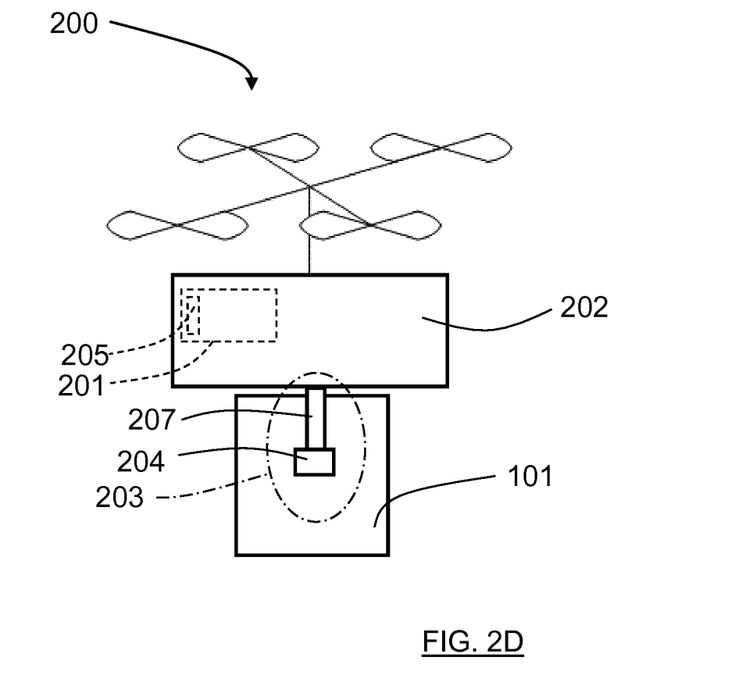
FIG. 2D schematically shows an un-manned aerial vehicle where the antenna element panel has a fourth position relative a body part of the aerial vehicle.

According to some aspects, as illustrated in FIG. 2A, the step-motor assembly 204 comprises two independently controllable step-motors 204a, 204b, enabling independent movement along two separate axis.

Figure 4:
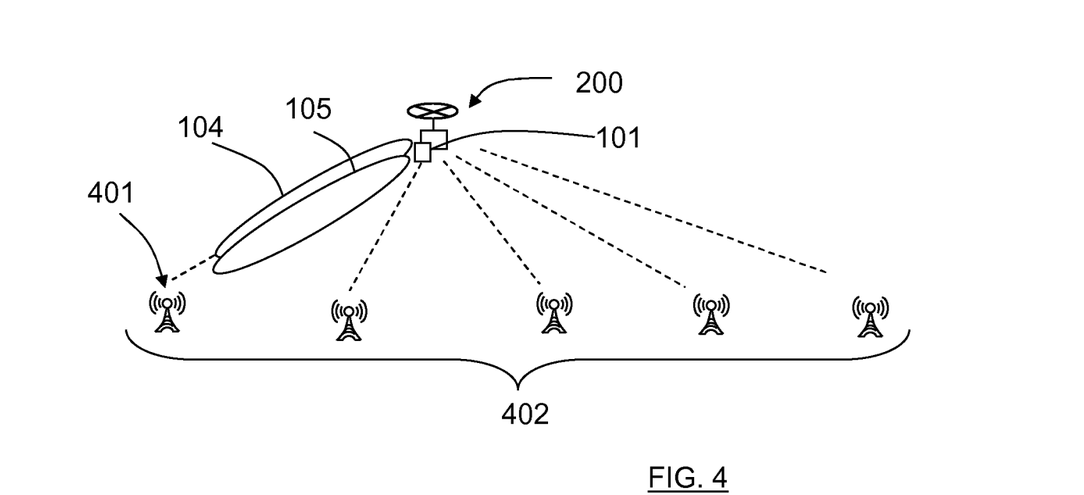
FIG. 4 schematically shows an un-manned aerial vehicle where a narrow antenna beam is directed towards a serving base station among a plurality of base stations.

As shown in FIG. 4, in this way it is possible for the antenna element panel 101 to provide narrow antenna beams 104, 105 towards a serving base station 401 among a plurality of base stations 402 regardless of in which direction the serving base station 401 lies.

The direction unit 203 further comprises a holding member 207 that attaches the step-motor assembly 204 to the body part 202 and a maneuvering rod 208 that connects the step-motor assembly 204 to the antenna element panel 101. The step-motor assembly 204 is thus adapted to move the maneuvering rod 208 and in that manner as a consequence also moving the antenna element panel 101.

Figure 3A:
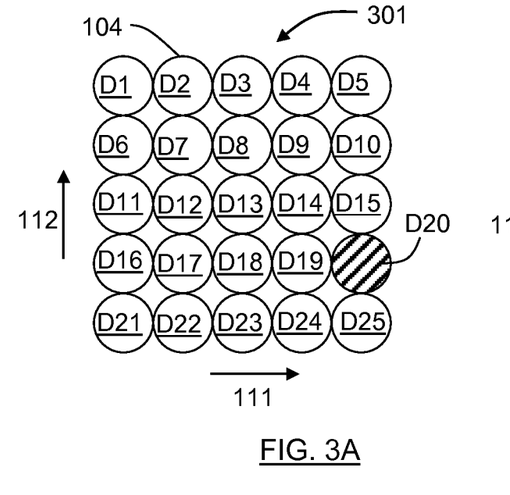
FIG. 3A schematically shows a first view of a beam grid of possible fixed beam directions.
Figure 3B:
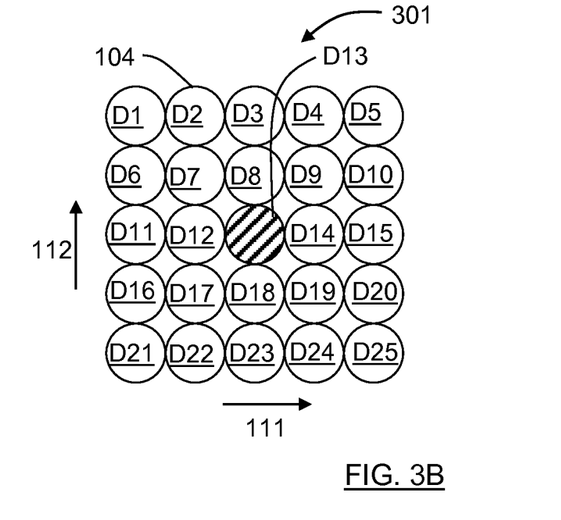
FIG. 3B schematically shows a second view of a beam grid of possible fixed beam directions.

In FIG. 3A and FIG. 3B an example is presented for the first antenna beam 104, where a plurality of possible fixed beam directions D1-D25 are shown in a grid 301 along the azimuth direction 111 and the elevation direction 112. The control unit 201 is adapted to steer the first antenna beam 104 to said fixed beam directions D1 -D25 and to determine where a highest signal strength is received. In this example, a signal of a highest signal strength is received from a certain determined beam direction D20 that lies in the periphery of the grid 301. The control unit 201 is adapted to set the antenna element panel 101 in a position in dependence of said determined direction D20.

According to some aspects the control unit 201 is adapted to set the antenna element panel 101 in such a position that the first antenna beam 104 has a minimized tilt angle relative the antenna element panel in the direction D13 a signal of a highest signal strength is received. In this example, that means that the antenna element panel 101 is moved such that the fixed beam direction where the highest signal strength is received is moved from the periphery of the grid 301 to the center of the grid 301 as shown in FIG. 3B.

This procedure is repeated as the aerial vehicle 200 is moved such that the beam direction where the highest signal strength is received is maintained in the center of the grid 301.

Practically, with reference also to FIG. 4, this means that steering of mechanical tilt of the antenna element panel 101 can be based on input of the direction of the current strongest beam for the serving base station 401, which typically will be determined during conventional beam management procedures that suitably are standardized. Assuming that the strongest beam of the antenna element panel 101 to a serving base station 104 is located in the border of the angular coverage of the antenna element panel 101, as illustrated in FIG. 3A, the control unit 201 can set the antenna element panel 101, i.e. change its mechanical tilt, such that the strongest direction to the serving base station 401 will point to the middle of the angular coverage of the antenna element panel 101, as illustrated in FIG. 3B.

By continuously adapting the positon of the antenna element panel 101, its mechanical tilt, in this way, the risk that the serving base station 401 ends up in a direction that is outside the angular coverage of the antenna element panel 101 will be significantly reduced. Also in case the coverage of the serving base station 401 is lost, the control unit 201 can control the positon of the antenna element panel 101 in order to search for new candidate base stations. among the available base stations 402.

Generally, the control unit 201 is adapted to set the antenna element panel 101 in such a position that contact with a serving base station 401 or similar is maintained as long as the communication channel is suitable. It is thus according to some aspects not necessary to keep the antenna element panel 101 in such a position that contact with a serving base station 401 direction is maintained by means of a current strongest beam, but just such that communication is maintained.

Narrow beam transmission and reception schemes will be needed at higher frequencies to compensate the high propagation loss. The task of discovering and maintaining suitable so-called beam pair links is called beam management.

The present disclosure is not limited to the examples above, but may vary freely within the scope of the appended claims. For example, the direction unit 203 can be of any suitable design. According to some aspects, the direction unit 203 can comprise any type of motor assembly that can comprise any suitable number of any suitable type of controllable electric motor such as for example one or more piezo-electric motors. The motor assembly can be directly mounted to the body 202, or even integrated into the body 202.

Figure 5:
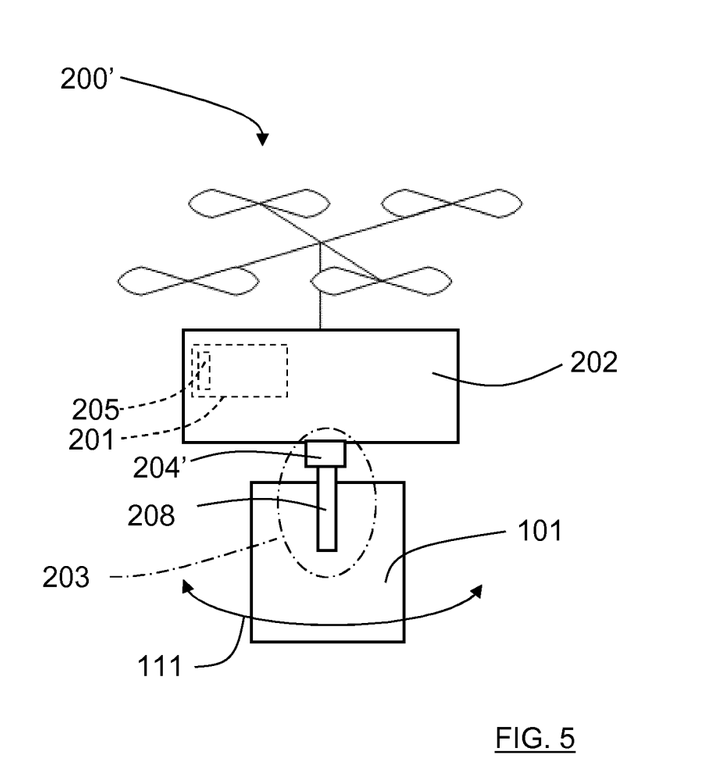
FIG. 5 schematically shows another example of an un-manned aerial vehicle.

According to some aspects, with reference to FIG. 5, the aerial vehicle 200' comprises an antenna element panel 101 that is connected to a controllable electric motor 204' that only allows rotation of the antenna element panel 101 in a horizontal plane such that the antenna element panel 101 gets coverage in all azimuth directions 111. Whenever a direction of an antenna beam that receives a signal of a highest signal strength gets close to the border of the angular coverage of the antenna element panel 101, the control unit 201 controls the motor 204' to mechanically rotate the antenna element panel 101 to make sure that an antenna beam that receives a signal of a highest signal strength stays within the angular coverage area of the antenna element panel 101 as described previously with reference to FIG. 3A and FIG. 3B. According to some aspects, the electric motor 204' is a step-motor.

According to some aspects, with reference to FIG. 2A, the aerial vehicle is arranged as a remote controlled un-manned aerial vehicle 200, wherein the control unit 201 comprises a communications module 205 arranged to receive control commands from a remote transceiver 206.

Generally, the antenna arrangement 100 comprises an antenna element panel 101 and at least one antenna port 102, 103 that is adapted to provide at least one antenna beam 104, 105 that is electrically steerable to at least two different directions 104, 104a, 104b, 104c, 104d; D1-D25. An aerial vehicle according to the present disclosure can comprise several antenna arrangements and corresponding direction units.

According to some aspects, the aerial vehicle 200 is configured at least in part for autonomous operation, wherein the control unit 201 is configured to autonomously generate control commands for controlling the aerial vehicle 200.

Figure 1A:
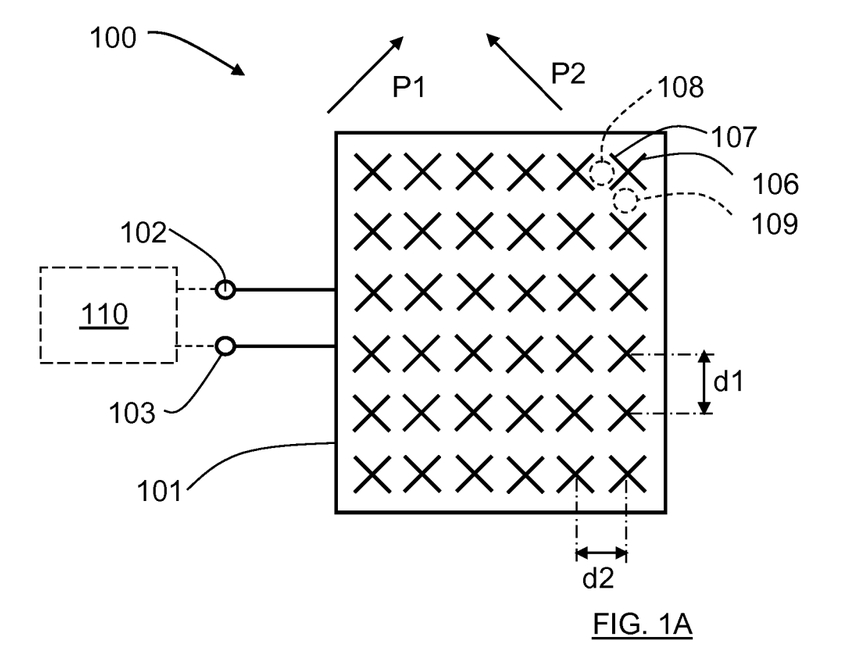
FIG. 1A schematically shows a front view of an antenna arrangement.
Figure 1B:
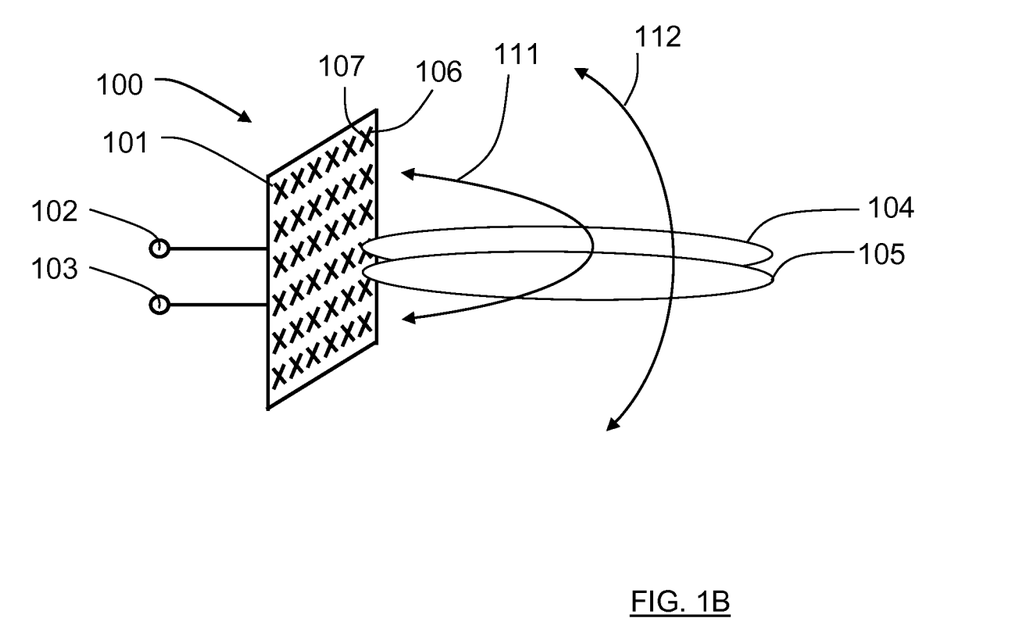
FIG. 1B schematically shows a first perspective view of the antenna arrangement.
Figure 1C:
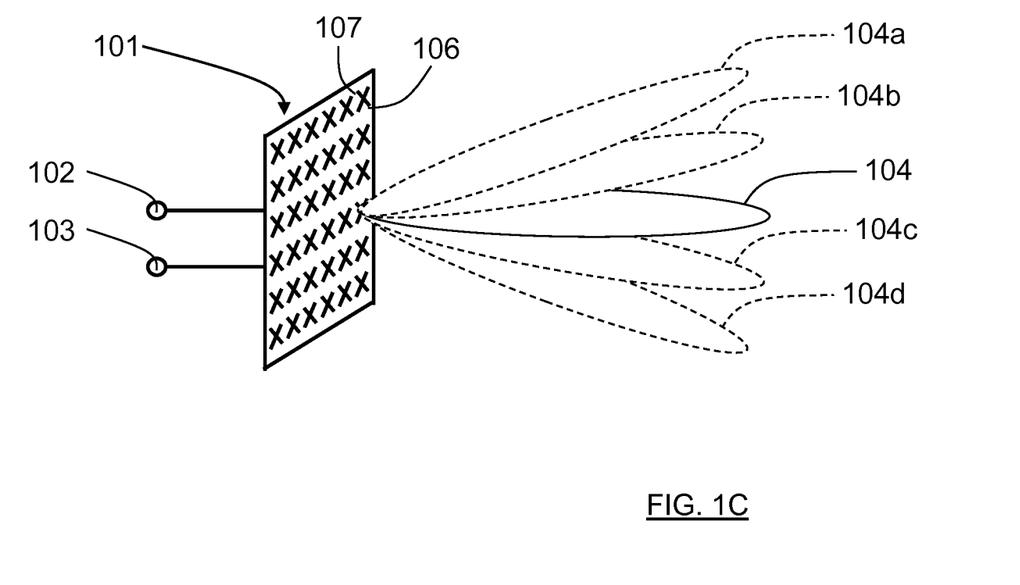
FIG. 1C schematically shows a second perspective view of the antenna arrangement.

The illustrations are purely schematical, for example the size of the antenna element panel 101 will vary depending on, for example, which frequency band that is used, the antenna element panel's array gain, number of antenna elements 106, 107 and antenna element separation d1, d2 as illustrated in FIG. 1A.

Figure 6:
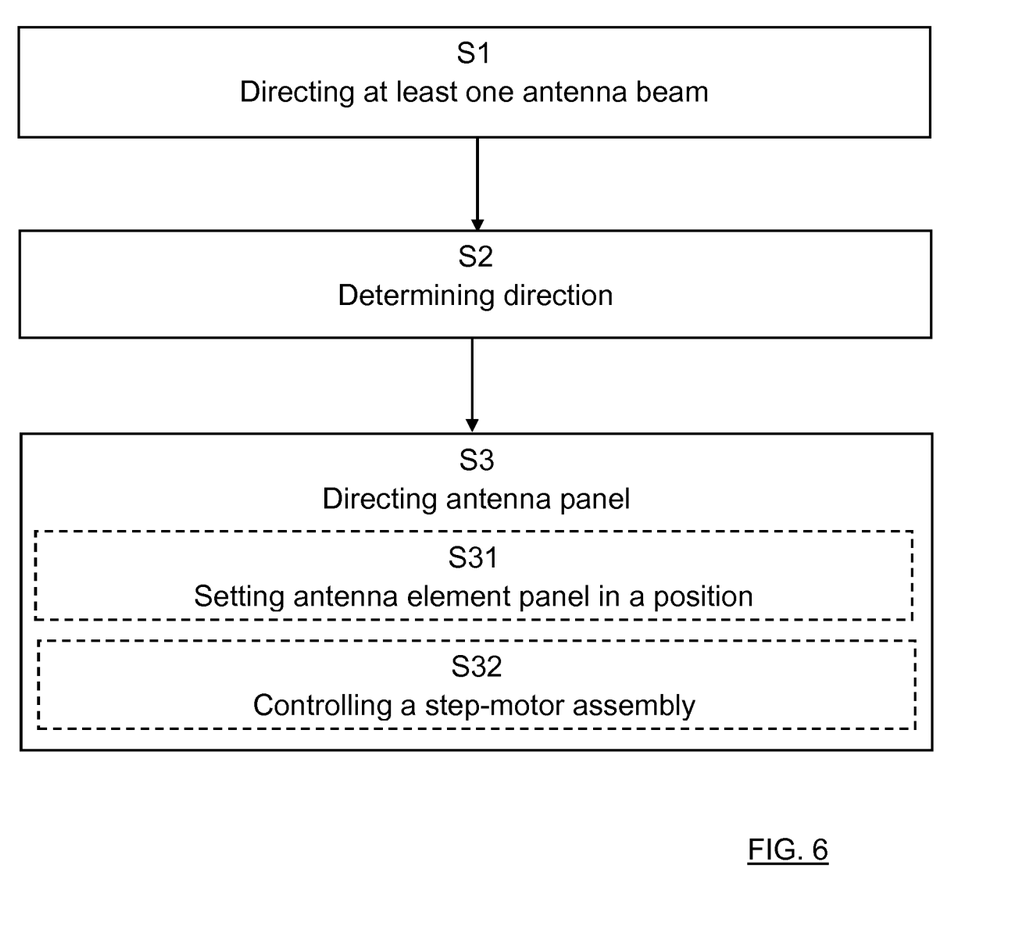
FIG. 6 shows a flowchart of methods according to the present disclosure.

With reference to FIG. 6, the present disclosure also relates to a method for controlling an antenna element panel 101 in an un-manned aerial vehicle 200, the method comprising:

directing S1 at least one antenna beam 104, 105 of the antenna element panel in at least two different directions 104, 104a, 104b, 104c, 104d; D1-D25;

determining S2 the direction D20 that results in a highest received signal strength for each antenna beam; and directing S3 the antenna element panel 101 in dependence of the determined direction D20.

According to some aspects, the directing S3 of the antenna element panel comprises setting S31 the antenna element panel in such a position that each steerable beam 104, 105 has a minimized tilt angle relative the antenna element panel 101 in the direction D13 a signal of a highest signal strength is received.

According to some aspects, the method comprises providing at least a first antenna beam 104 of a first polarization P1 and a at least a second antenna beam 105 of a second polarization P2, orthogonal to the first polarization P1.

According to some aspects, the directing S3 of the antenna element panel 101 comprises controlling S32 a step-motor assembly 204 such that a desired position of the antenna element panel is maintained.

Figure 7:
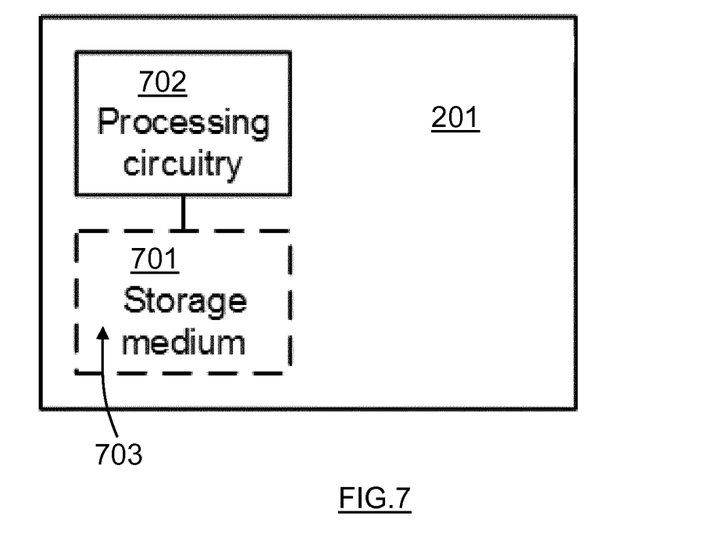
FIG. 7 schematically shows an example of a control unit.

FIG. 7 shows one example of a control unit 201 that comprises a computer readable storage medium 701 and processing circuitry 702, where a computer program 703 for controlling an antenna element panel 101 in an un-manned aerial vehicle 200 comprises computer code stored on the computer readable storage medium 702.

When run on the processing circuitry 702 of the control unit 201, the computer program causes the control unit 201 to:

direct at least one antenna beam 104, 105 of the antenna element panel in at least two different directions 104, 104a, 104b, 104c, 104d; D1-D25;

determine the direction D20 that results in a highest received signal strength for each antenna beam; and direct the antenna element panel 101 in dependence of the determined direction D20.

The computer readable storage medium 701 is suitably embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

The control unit 201 be constituted by a single unit or by two or more separate units.

Generally, the present disclosure also relates to un-manned aerial vehicle 200 comprising a control unit 201, a body part 202 and an antenna arrangement 100 that comprises an antenna element panel 101 and at least one antenna port 102, 103 that is adapted to provide at least one antenna beam 104, 105 that is electrically steerable to at least two different directions 104, 104a, 104b, 104c, 104d; D1-D25, wherein the aerial vehicle 200 further comprises a direction unit 203 that connects the antenna element panel 101 to the body part 202, where the direction unit 203 is adapted to set the antenna element panel 101 in at least two different positions relative the body part 202.

According to some aspects, the antenna arrangement comprises a first antenna port 102 adapted to provide at least a first antenna beam 104 of a first polarization P1 and a second antenna port 103 adapted to provide at least a second antenna beam 105 of a second polarization P2, orthogonal to the first polarization P1.

According to some aspects, the direction unit 203 comprises a step-motor assembly 204 that is connected to the antenna element panel 101, where the control unit 201 is adapted to control the step-motor assembly 204 such that a desired position of the antenna element panel 101 is maintained.

According to some aspects, the step-motor assembly 204 comprises two independently controllable step-motors 204a, 204b.

According to some aspects, the control unit 201 is adapted to steer each antenna beam 104, 105 to at least two different directions D1-D25 and to determine in which direction D20 each antenna port 102, 103 is enabled to receive a signal of a highest signal strength, and to set the antenna element panel 101 in a position in dependence of said determined direction D20.

According to some aspects, the control unit 201 is adapted to set the antenna element panel 101 in such a position that each steerable beam 104, 105 has a minimized tilt angle relative the antenna element panel in the direction D13 a signal of a highest signal strength is received.

According to some aspects, each antenna port 102, 103 is connected to a plurality of antenna elements 106, 107 via a corresponding phase altering device 108, 109 for each antenna element 106, 107, where the control unit 201 is adapted to control each phase altering device 108, 109.

According to some aspects, each antenna port 102, 103 is connected to a digital beamforming (DBF) network 110.

The invention claimed is:

1. An un-manned aerial vehicle comprising:
a control unit;
a body part;
an antenna arrangement that comprises an antenna element panel and at least one antenna port that is configured to provide at least one antenna beam that is electrically steerable to at least two different directions;
a direction unit that connects the antenna element panel to the body part, the direction unit being configured to set the antenna element panel in at least two different positions relative to the body part; and
the control unit being configured to steer each antenna beam to at least two different directions of a grid and to determine in which direction each antenna port is enabled to receive a signal of a highest signal strength, and to set the antenna element panel in a position in dependence of the determined direction, and the control unit is further configured to set the antenna element panel in such a position that each steerable beam has a minimized tilt angle relative to the antenna element panel in the direction a signal of a highest signal strength is received, such that the antenna element panel is moved such that the fixed beam direction where the highest signal strength is received is moved from a periphery of the grid to the center of the grid.

2. The aerial vehicle according to claim 1, wherein the antenna arrangement comprises a first antenna port configured to provide at least a first antenna beam of a first polarization and a second antenna port configured to provide at least a second antenna beam of a second polarization, orthogonal to the first polarization.

3. The aerial vehicle according to claim 1, wherein the direction unit comprises a step-motor assembly that is connected to the antenna element panel, where the control unit is configured to control the step-motor assembly such that a desired position of the antenna element panel is maintained.

4. The aerial vehicle according to claim 3, wherein the step-motor assembly comprises two independently controllable step-motors.

5. The aerial vehicle according to claim 1, wherein each antenna port is connected to a plurality of antenna elements via a corresponding phase altering device for each antenna element, where the control unit is configured to control each phase altering device.

6. The aerial vehicle according to claim 1, wherein each antenna port is connected to a digital beamforming, DBF, network.

7. The aerial vehicle according to claim 1, configured as a remote controlled un-manned aerial vehicle, wherein the control unit comprises a communications module configured to receive control commands from a remote transceiver.

8. The aerial vehicle according to claim 1, wherein the aerial vehicle is configured at least in part for autonomous operation, wherein the control unit is configured to autonomously generate control commands for controlling the aerial vehicle.

9. The aerial vehicle according to claim 2, wherein the direction unit comprises a step-motor assembly that is connected to the antenna element panel, where the control unit is configured to control the step-motor assembly such that a desired position of the antenna element panel is maintained.

10. The aerial vehicle according to claim 9, wherein the step-motor assembly comprises two independently controllable step-motors.

11. The aerial vehicle according to claim 10, wherein each antenna port is connected to a plurality of antenna elements via a corresponding phase altering device for each antenna element, where the control unit is configured to control each phase altering device.

12. The aerial vehicle according to claim 2, wherein each antenna port is connected to a plurality of antenna elements via a corresponding phase altering device for each antenna element, where the control unit is configured to control each phase altering device.

13. The aerial vehicle according to claim 2, wherein each antenna port is connected to a digital beamforming, DBF, network.

14. The aerial vehicle according to claim 2, configured as a remote controlled un-manned aerial vehicle, wherein the control unit comprises a communications module configured to receive control commands from a remote transceiver.

15. The aerial vehicle according to claim 2, wherein the aerial vehicle is configured at least in part for autonomous operation, wherein the control unit is configured to autonomously generate control commands for controlling the aerial vehicle.

16. A method for controlling an antenna element panel in an un-manned aerial vehicle, the method comprising:
directing at least one antenna beam of the antenna element panel in at least two different directions of a grid;

determining the direction that results in a highest received signal strength for each antenna beam; and directing the antenna element panel in dependence of the determined direction, the directing of the antenna element panel comprising setting the antenna element panel in such a position that each steerable beam has a minimized tilt angle relative to the antenna element panel in the direction a signal of a highest signal strength is received, such that the antenna element panel is moved such that the fixed beam direction where the highest signal strength is received is moved from a periphery of the grid to the center of the grid.

17. The method according to claim 16, wherein the method further comprises providing at least a first antenna beam of a first polarization and a at least a second antenna beam of a second polarization, orthogonal to the first polarization.

18. The method according to claim 16, wherein the directing of the antenna element panel further comprises controlling a step-motor assembly such that a desired position of the antenna element panel is maintained.

19. The method according to claim 17, wherein the directing of the antenna element panel further comprises controlling a step-motor assembly such that a desired position of the antenna element panel is maintained.

* * * * *